United States Patent [19]

Bock

[11] Patent Number: 4,601,679
[45] Date of Patent: Jul. 22, 1986

[54] VARIABLE PULLEY TORQUE DRIVE MEANS

[75] Inventor: Thomas J. Bock, Streamwood, Ill.

[73] Assignee: Borg-Warner Corporation, Chicago, Ill.

[21] Appl. No.: 734,695

[22] Filed: May 16, 1985

[51] Int. Cl.[4] ............................................. F16H 11/06
[52] U.S. Cl. ........................................ 474/11; 474/12; 474/17
[58] Field of Search ................. 474/17, 18, 8, 19, 21, 474/22, 11, 12

[56] References Cited

U.S. PATENT DOCUMENTS

| | | | |
|---|---|---|---|
| 2,803,143 | 8/1957 | Michie | 474/8 X |
| 2,938,395 | 5/1960 | Hovorka | 474/17 |
| 3,393,572 | 7/1968 | Larsson | 474/17 |
| 3,752,014 | 8/1973 | Holtan | 474/17 X |
| 3,868,862 | 3/1975 | Bessette | 474/12 |

Primary Examiner—James A. Leppink
Assistant Examiner—Frank McKenzie
Attorney, Agent, or Firm—Florian S. Gregorczyk

[57] ABSTRACT

A variable pulley torque drive system comprising a pair of flexible straps, each connected at one end to a pivot on a drive member or a movable pulley sheave, and at the other end to the other of either the movable sheave or drive member, the straps being in tension when driving and flexed and deflected to compression in the undriven mode.

16 Claims, 10 Drawing Figures

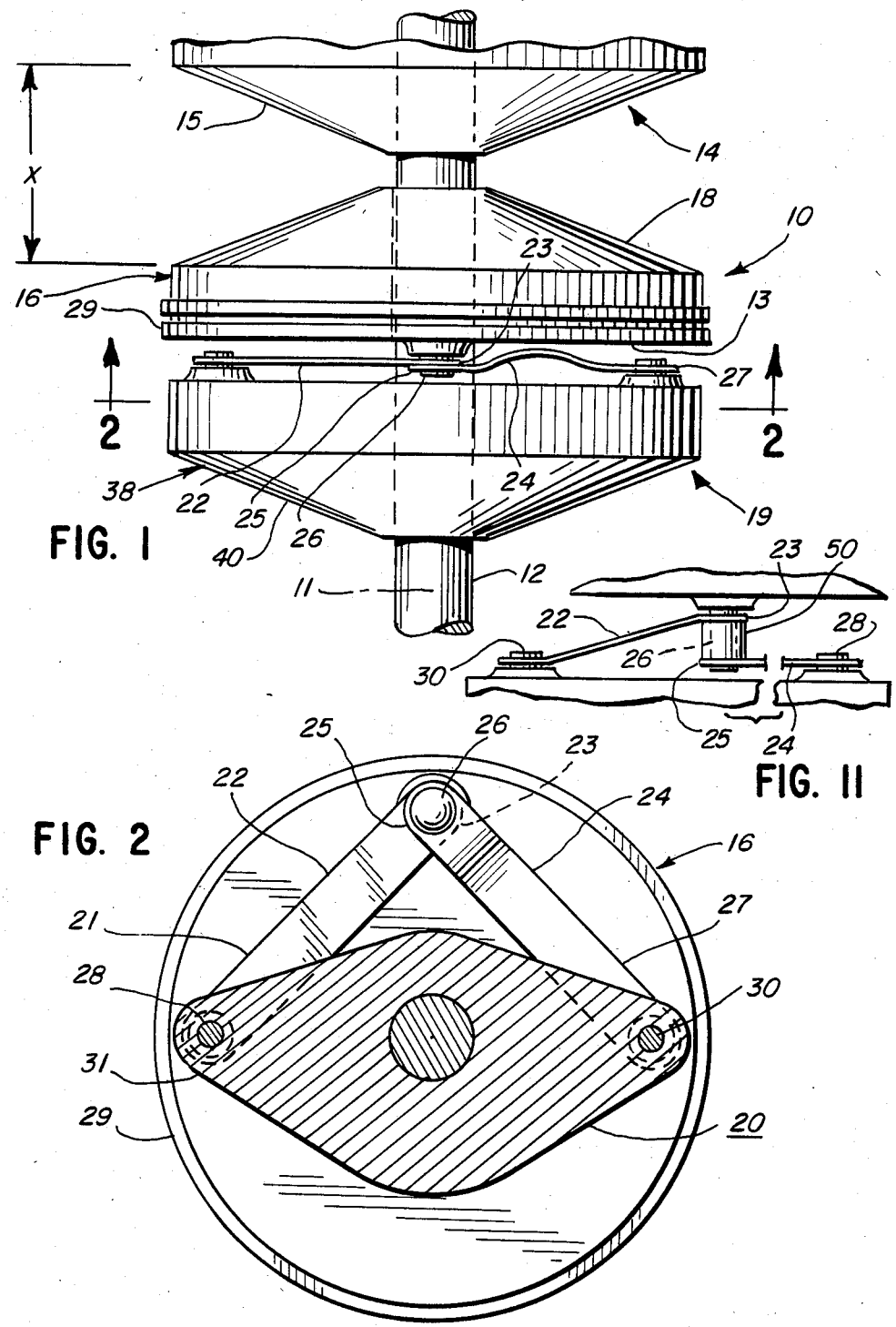

FIG. 3
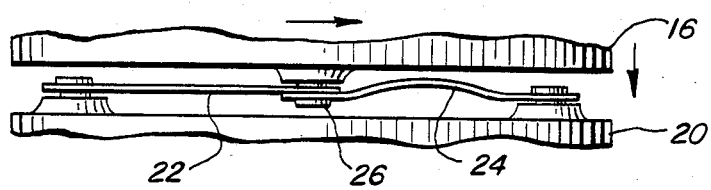
FIG. 4
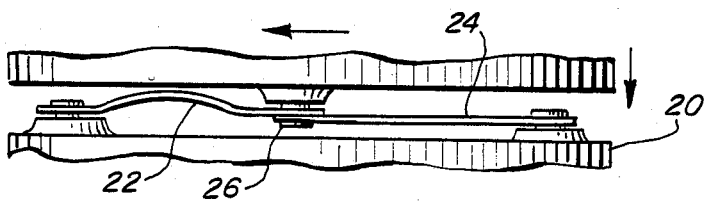
FIG. 5
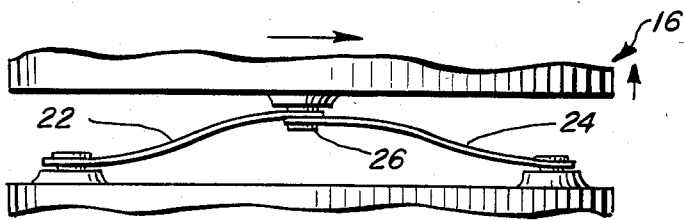
FIG. 6
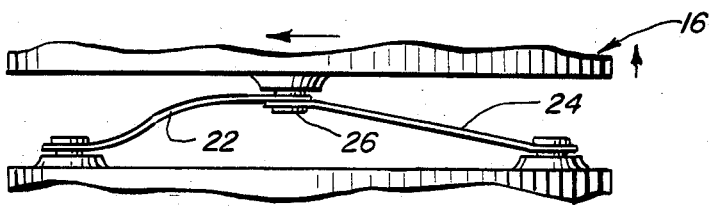
FIG. 7
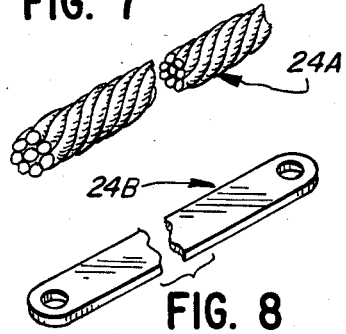
FIG. 8
FIG. 9
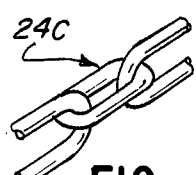
FIG. 10
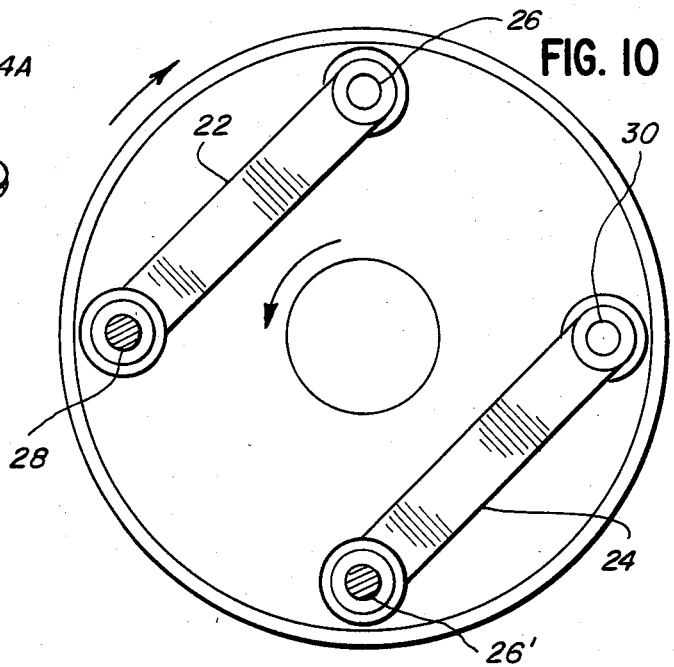

VARIABLE PULLEY TORQUE DRIVE MEANS

BACKGROUND OF THE INVENTION

1. Field of the Invention

This application relates to pulley drives and especially to pulleys constructed of a pair of flanges with at least one of the flanges axially movable with respect to the other. Such pulleys find use in variable pulley transmissions and especially those referred to as continuously variable transmissions (CVT). The pulleys in a CVT are connected by means of drive belts, chainbelts or the like.

2. Background Information

Variable pulley transmissions have been used for some time for transferring torque from an input or drive shaft to an output or driven shaft. In these transmissions, a first pulley constructed of a pair of flanges is mounted on the input shaft such that at least one of its flanges is axially movable with respect to its other flange. A second, similarly constructed and adjustable pulley, is mounted on the output shaft. A flexible belt connects the two pulleys to transfer torque therebetween when the input shaft is driven. As the effective diameter of one pulley is changed by flange movement along the shaft axis and, simultaneously, the effective diameter of the other pulley is changed by flange movement in the opposite direction, the speed ratio between the input and output is adjusted in a smooth, continuous manner. Mechanical or hydraulic means and/or combinations of the two means are usually provided for initiating the drive ratio changes. The prior art is replete with such arrangements.

In the prior art, the axially movable flange of each pulley or a hub of such flange may be provided with an internal keyway to receive a key fitting in a keyway in the respective shaft. The key and keyway provide the driving connection between flange and shaft while permitting axial movement of at least one of the flanges. Keyways are machined in the shafts and flanges, an expensive procedure, and lubrication of the key-keyaway connection is a necessity to prevent galling and/or binding, although such lubrication is difficult at times. In the absence of proper lubrication, the key may bind in the keyways, flange movement would be inhibited and drive ratio changes impeded. Loading on an unlubricated key becomes excessive due to the mass of the pulley rotating at relatively high speeds, which leads to premature failure of the transmission.

Another form of movable flange-shaft connection is a ball and spline arrangement, which uses a plurality of balls functioning as anti-friction elements with a spline. The ball-spline connection is located internally of the flange and/or its hub. This type of connection is expensive and requires continuous lubrication to ensure its continued performance. Loading on an unlubricated spline of the ball-spline connection can also become excessive, leading to premature failure of the transmission.

Instead of movable flange-shaft connections as above described. Bessette, in U.S. Pat. No. 3,868,862 teaches the use of a pivotably connected link or links between the movable flange and the drive member. In one embodiment, a single link is circumferentially arranged with respect to the flange and drive member. Another embodiment illustrates three spaced links angularly arranged with respect to the flange and drive member. In both embodiments, the links must be rigid or stiff and must be provided with pivoting joints, which are universal joints in the case of the second embodiment. These joints must be constantly lubricated to operate properly. The link or links exert a force component to the pulley flange which either adds to or subtracts from the force applied to the flange by other means.

SUMMARY OF THE INVENTION

The invention provides an improved pulley drive arrangement which drives an axially movable pulley flange of a CVT in either of the two direction of rotation. This arrangement utilizes flexible straps and is both efficient and inexpensive as it requires no machining of the parts beyond a basic stamping. The pulley drive arrangement comprises a pair of flexible straps both connected at one of their ends to a single pivot on the flange and the other ends of the straps are connected at spaced pivots on a spider or the like on the rotatable shaft of the pulley. The straps may also be positioned in a diametrically opposed manner to provide a dynamic balance to the arrangement. The movable pulley flange is supported by a hub on the shaft to permit its axial movement.

The driving strap, that is the straightened strap, is in tension while the other strap can freely buckle. Reversal of the direction of rotation causes reversal of the load bearing characteristic of the straps to change; that is, the buckle strap is then in tension and the tension strap may then freely buckle. The length of one strap may be slightly longer than the distance between the pivots where its ends are connected, thus allowing the pulley flange to slightly rotate during axial movement to accommodate the extension between these pivots. However, a limiting case is provided where the pulley sheaves are at the minimum separation and the straps are of equal length. At the minimum sheave separation the straps should be long enough to bridge the distance between the pivots, but this strain on the straps should be below the tensile stress of the strap. The strap arrangement reduces the number of relatively movable parts and surfaces in pulley systems with both rotational and axial movement to significantly reduce the lubricating parts in the pulley system.

The straps as noted must be flexible to permit axial movement of the pulley flange relative to the shaft-mounted drive spider. This flexibility implies that various configurations of straps may be provided such as ropes or rope like elements, cord, thin metal or laminates of thin metal, flexible chain or other flexible members. All of these strap forms are relatively inexpensive.

BRIEF DESCRIPTION OF THE DRAWING

In the figures of the Drawing like reference numerals identify like components and in that Drawing;

FIG. 1 is a side view of a variable pulley arrangement according to the invention;

FIG. 2 is a cross sectional view taken on line 2—2 of FIG. 1;

FIGS. 3, 4, 5 and 6 are side views of the straps at two extreme positions of the movable pulley flange for both the forward and reverse torque conditions;

FIGS. 7, 8 and 9 are front views of alternative embodiments of straps; and

FIG. 10 is a view similar to FIG. 2 of an alternative embodiment of the pulley strap and spider arrangement; and FIG. 11 is a side view of a spacer element at a common pivot of the movable sheave.

DETAILED DESCRIPTION OF THE PREFERRED EMBODIMENT

A variable pulley transmission (as known in the art) generally comprises at least two pulleys connected by a belt. As both pulleys are essentially the same, a discussion of one pulley further describes the second pulley. A variable pulley 10 of such a transmission is illustrated in FIG. 1 connected to a shaft 12, which may be either a drive or driven shaft with a longitudinal axis 11.

Pulley 10 includes a fixed sheave 14 with a flange face 15, and a movable sheave 16 with a flange face 18 and back face 13. Movable sheave 16 is movable along shaft 12 and longitudinal axis 11 by a longitudinal pulley drive system 38, which system may be electrical, hydraulic, pneumatic or mechanical. Part of such pulley drive systems include keys and keyways or ball and spline arrangements to transmit the torque load to the flange of the pulley. On the reverse side of flange face 18 and sheave 16 is a mechanical variable pulley torque drive system 19 having a drive member or spider 20 secured to shaft 12 and including a pair of torque-transmitting strap members 22 and 24 illustrated in FIGS. 1-6. In FIG. 2, a first strap 22 with first end 21 and second end 23, and a second strap 24 with third end 25 and fourth end 27 are drivingly connected between drive member or spider 20 and movable sheave 16. Each of the straps is, therefore, provided with a first and second end, respectively. Sheave 16 has an outer perimeter 29 and a common pivot 26. Spider 20 with an outer edge or perimeter 31 defines a first spaced pivot 28 and a second spaced pivot 30 at outer edge 31 in proximity to outer perimeter or extremity 29 of sheave 16. Second end 23 and third end 25 of straps 22 and 24, respectively, are mounted at and rotatable about common pivot 26. First end 21 and fourth end 27 are mounted at and rotatable about first spaced pivot 28 and second spaced pivot 30, respectively. The ends of straps 22 and 24 may be interchanged as they are not unique. Spider 20 is illustrated in FIG. 2 with almost and 24 may be interchanged as they are not unique. Spider 20 is illustrated in FIG. 2 with almost a rhombihedral shape although the shape of the drive member is not limited to such geometry.

Straps 22 and 24 are approximately the same length, however, in an alternate embodiment one of the straps may be slightly longer than the other to provide for the slight change in length of travel in the usual direction of rotation. The pivot point locations are also not unique, that is straps 22 and 24 may be joined at a single pivot on spider 20 while their free ends can be connected to spaced locations on the pulley sheave 16.

Straps 22 and 24 must be flexible to permit axial movement of pulley sheave 16. In operation, one of straps 22 or 24 is in tension and straightens out, while the other buckles or deflects due to the axial travel of the sheave 16. When the direction of the torsional load is reversed, the buckled strap would straighten under a tensile load and the other strap would buckle. During the reversal of torsional rotation pivot 26 is displaced relative to pivots 28 and 30. This results in a slight angular displacement between the sheaves resulting in an incremental belt slippage. The relative pivot displacement increases with the degree of strap buckling. In a preferred embodiment, the relative pivot displacement can be minimized if the plane of the pivots becomes parallel to the sheave back face 13 or perpendicular to shaft axis 11 at about the midpoint separation distance of sheaves 14 and 16. Thus straps 22 and 24 may have varying shapes. However, whatever the shape or the material of straps 22 and 24, they must flex, deform or deflect without yielding. Changes in tension and buckling are illustrated in FIGS. 3 through 6.

The limiting case of strap elongation occurs when the straps 22 and 24 are of equal length and they are in an unstrained condition at maximum sheave separation 'x' of FIG. 1. Thereafter, the greatest tensile load occurs at minimum sheave separation, that is when sheaves 14 and 16 are closest together. At the minimum separation distance the straps 22 and 24 should be long enough to bridge the distance between pivots 26 and pivots 28 or 30. Further, the ultimate tensile stress of straps 22 and 24 should exceed the stress at this minimum sheave separation distance.

In the case of equal length straps, a spacer 50 may be positioned on the common pivot to separate the equal-length strap ends. This spacer length is equal to the travel distance of the movable sheave. The combination of the equal length straps and the spacer will minimize the rotational movement of the sheave. Shown in FIG. 11 is an embodiment of the invention including the use of a spacer 50 to separate the equal-length strap ends 23 and 25 at common pivot 26. Spacer 50 is equal in length to the travel distance of movable sheave 16. The straps 22 and 24 are equal in length for mounting at the midpoint of the travel of movable sheave 16. The length of pivot 26 may be accommodated by several means including a recess in drive member 20 or by extending the length of pivots 28 and 30. This is a design choice and is not a part of the present invention.

In FIGS. 3 and 4 the slight buckling of one of the straps 22 and 24 is illustrated in an exaggerated manner for maximum pulley sheave separation for a forward torque and a reverse torque operation, respectively. At maximum sheave separation, note that the pivots are shown in planar alignment. FIGS. 5 and 6 illustrate the slight buckling of the straps for the forward and reverse torque conditions when the pulley sheaves are close together. In FIG. 3 when the sheaves are furthest apart and in the forward torque mode, the axis of pivot 26 and the longitudinal axis 11 are aligned, whereas in each of the other illustrated modes of FIGS. 4, 5 and 6 there is a slight axial displacement as a measure of relative displacement between the sheaves. This movement of the shaft axis may vary with the original orientation of the pivots or the strap length. Rope; ropelike cord; thin, metal strips; connected, open-centered links or other types of structures may be utilized for such straps. These alternative strap embodiments are illustrated by numerals 24A, 24B and 24C in FIGS. 7, 8 and 9, respectively.

In an alternative embodiment, shown in FIG. 10, the common pivot point 26 may, in fact, be two pivot points 26, 26', diametrically opposed and thereafter connected to either of straps 22 or 24. Pivot points 28 and 30 can be fixed to either a spider 20, as shown in FIG. 2, or mounted on the mechanism housing 40. It is only requisite that pivots 28 and 30 be suitably mounted on some member secured to shaft 12 so that pivots 28 and 30 are relatively unmovable, as compared to the pivot points on the movable sheave. This same relatively unmovable pivot requirement prevails for the earlier embodiment, which implies that the use of a spider can be avoided where another secure element is available, such as the mechanism housing 40. This alternative structure of FIG. 10 provides a dynamic balance condition to such strap arrangement.

While only specific embodiments of the invention have been described and shown, it is apparent that various alterations and modifications can be made therein. It is, therefore, the intention in the appended claims to cover all such modifications and alterations as may fall within the true scope and spirit of the invention.

I claim:

1. A variable pulley torque drive system of a longitudinal pulley drive system having at least one rotatable shaft with a longitudinal axis;
a variable pulley mounted on said shaft;
said pulley comprising a fixed sheave mounted and secured on said shaft and a movable sheave mounted on and axially movable on said shaft parallel to said longitudinal axis;
said movable sheave defining a flange face and a back face;
said torque drive system having a drive member mounted on and secured to said shaft in proximity to said movable sheave back face;
said drive member defining at least one pivot;
said movable sheave defining at least one spaced pivot on said back face;
a first flexible strap and a second flexible strap to transfer torque loading between said movable sheave and said shaft, each of said straps having a first end and a second end, said first ends connected to at least one of said pivots on either of said back face or said drive member and said second ends independently connected to said pivots of the other of said back face or said drive member.

2. A variable pulley torque drive system as claimed in claim 1, wherein said first and second straps are of equal length.

3. A variable pulley torque drive system as claimed in claim 1, wherein said first strap and said second strap first ends are connected to a single pivot of said movable sheave.

4. A variable pulley torque drive system as claimed in claim 1, wherein said first strap, first end and said second strap, first end are connected to a single pivot of said drive member.

5. A variable pulley torque drive system as claimed in claim 1, wherein said first strap and second strap are rope.

6. A variable pulley torque drive system as claimed in claim 1, wherein said first strap and second strap are flexible cord.

7. A variable pulley torque drive system as claimed in claim 1, wherein said first strap and second strap are a plurality of open-centered links forming a chain.

8. A variable pulley torque drive system as claimed in claim 1, wherein said longitudinal pulley drive system to axially move said movable sheave includes a housing and said drive member for said first strap and second strap is said housing.

9. A variable pulley torque drive system of a longitudinal pulley drive system having at least one rotatable shaft with a longitudinal axis;
a variable pulley mounted on said shaft;
said pulley comprising a fixed sheave mounted and secured on said shaft and a movable sheave mounted on and axially movable on said shaft parallel to said longitudinal axis;
said movable sheave defining a flange face and a back face;
said torque drive system having a drive member mounted on and secured to said shaft in proximity to said movable sheave back face;
said drive member defining two spaced pivots;
said movable sheave defining two spaced pivots on said back face;
a first flexible strap and a second flexible strap to transfer torque loading between said movable sheave and said shaft, each of said straps having a first end and a second end, said first ends connected to one of said pivots on either of said back face or said drive member and said second ends independently connected to one of said pivots of the other of said back face or said drive member.

10. A variable pulley torque drive system as claimed in claim 9, said variable pulley including a hydraulic mechanism to axially move said movable sheave, which mechanism includes a housing wherein said drive member for said first strap and second strap is said hydraulic-mechanism housing.

11. A variable pulley torque drive system as claimed in claim 9, wherein said first strap and second strap are approximately parallel one to the other.

12. A variable pulley torque drive system as claimed in claim 1, wherein said movable sheave and said fixed sheave define a separation distance therebetween with a minimum and maximum distance;
each of said straps having an ultimate tensile strength greater than the tensile load at the minimum sheave separation distance.

13. A variable pulley torque drive system as claimed in claim 9, wherein said movable sheave and said fixed sheave define a separation distance therebetween with a minimum and maximum distance;
each of said straps having an ultimate tensile strength greater than the tensile load at the minimum sheave separation distance.

14. A variable pulley torque drive system as claimed in claim 3, wherein said first and second straps are of equal length.

15. A variable pulley torque drive system as claimed in claim 14, wherein said first strap first end and said second strap first end at said single pivot of said movable sheave are separated by a spacer.

16. A variable pulley torque drive system as claimed in claim 15, wherein said spacer is equal in length to the travel distance of said movable sheave.

* * * * *